Dec. 23, 1952     S. J. ZAGEL     2,622,921
VEHICLE AIR DEFLECTOR
Original Filed Sept. 30, 1949     2 SHEETS—SHEET 1
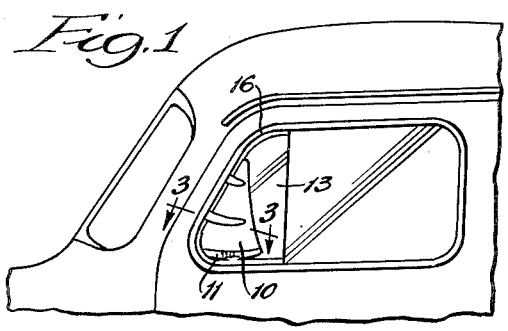
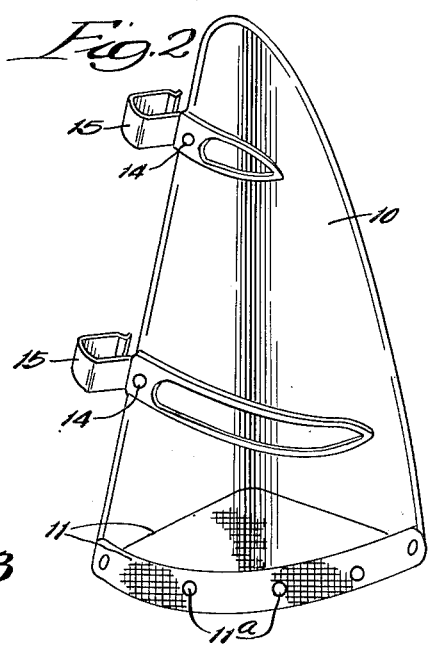
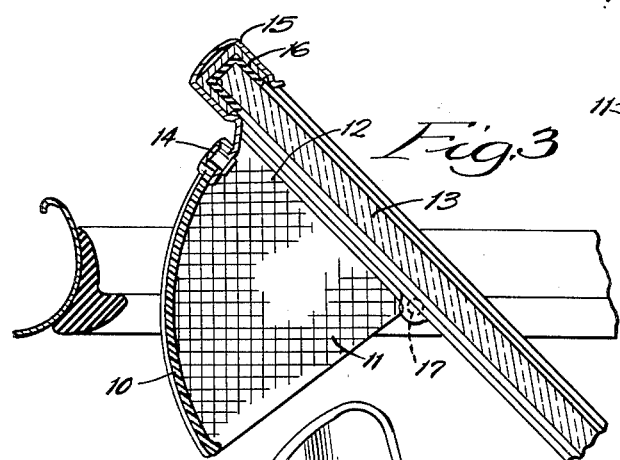
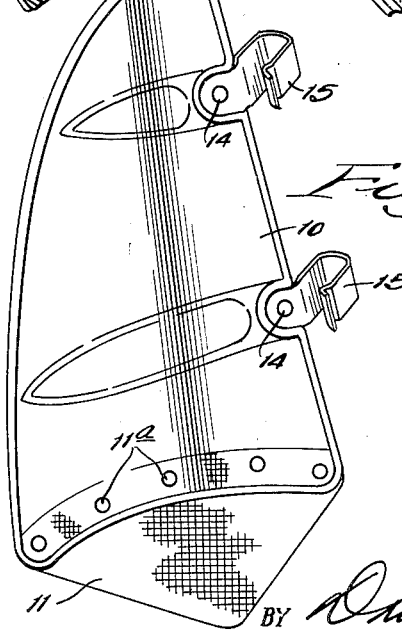
INVENTOR:
Samuel J. Zagel,
BY Dawson & Cows,
ATTORNEYS.

Dec. 23, 1952 S. J. ZAGEL 2,622,921
VEHICLE AIR DEFLECTOR
Original Filed Sept. 30, 1949  2 SHEETS—SHEET 2
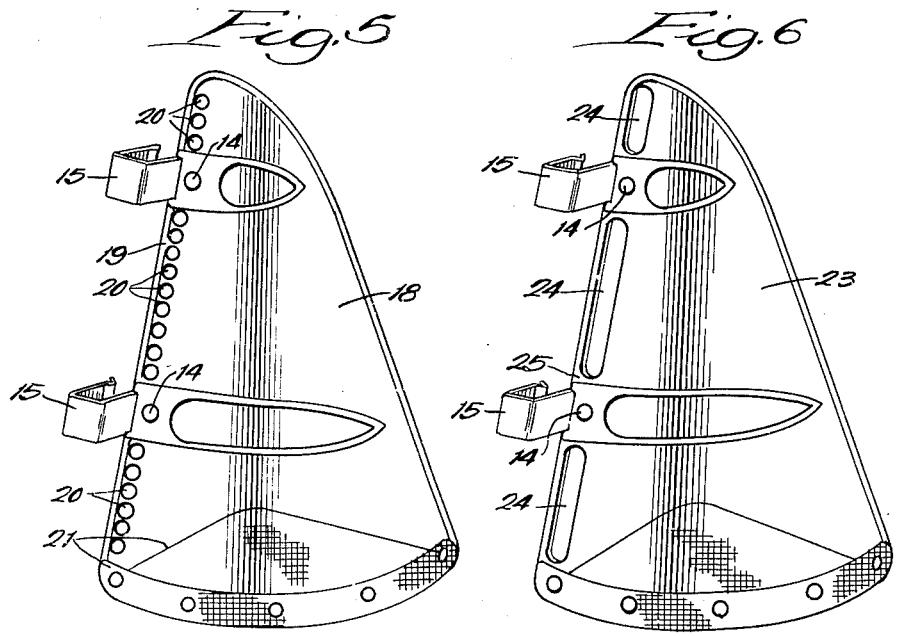
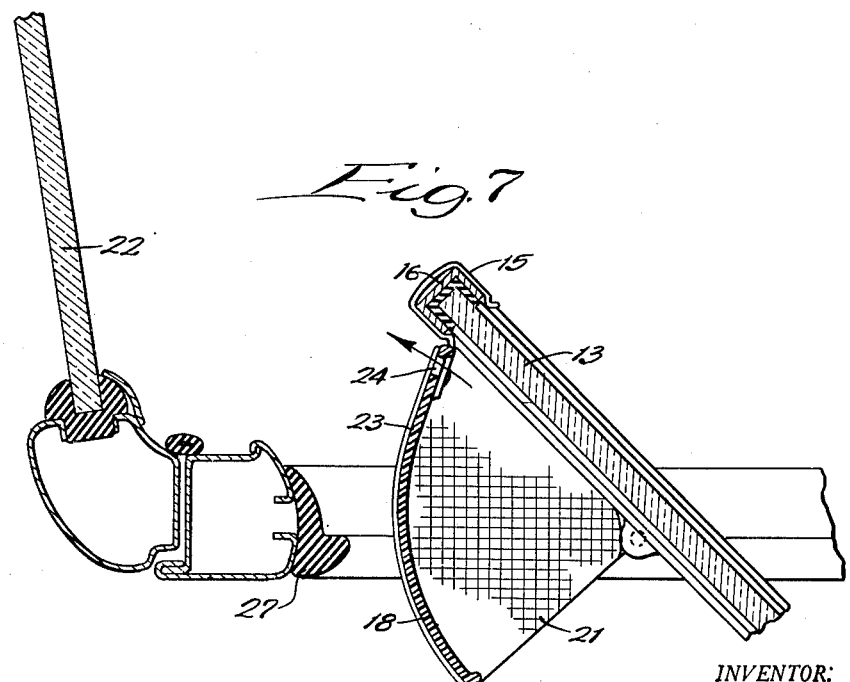
INVENTOR:
Samuel J. Zagel,
BY Dawson & Coms,
ATTORNEYS.

Patented Dec. 23, 1952

2,622,921

UNITED STATES PATENT OFFICE 2,622,921

VEHICLE AIR DEFLECTOR

Samuel J. Zagel, Chicago, Ill.

Original application September 30, 1949, Serial No. 118,926. Divided and this application March 22, 1951, Serial No. 216,930

4 Claims. (Cl. 296—44)

This invention relates to a vehicle air deflector and the deflector structure is particularly useful when applied to a vertically-pivoted ventilator or window adjacent the front seat of an automobile.

This application is a division of my co-pending application, Serial No. 118,926, filed September 30, 1949, for Vehicle Air Deflector.

Air deflectors have been used with the front vertically-pivoted ventilator window or windows of an automobile and have enjoyed considerable popularity because of the ability of the deflector to direct the current of air toward th front seat of the car and against the legs of the driver, etc. When driving in hot weather, the deflected current is appreciated but in the open country it is found that large numbers of insects are also thrown downwardly into the lap of the driver and against the feet of the driver. Even though a net or other means be employed to collect the insects, the task of removal, etc. is disagreeable. The problem presented, therefore, is not merely one for shielding the driver from such insects but rather one for collecting the insects and permitting their removal intermittently without appreciable effort and without bringing the driver into contact with the insects.

A great advantage would be gained if a portion of the air deflected by the air deflector could be utilized for sweeping the inner wall of the windshield to remove fog or water condensation, etc. thereon. With the present type of deflector, this has been impossible because the air is directed bodily in a downward current toward the knees of the driver.

An object of the present invention is to provide an air deflector equipped with means for collecting insects which would otherwise be thrown upon the driver and permitting their quick and substantially automatic removal from the collector screen by a movement of the pivotally-mounted window. Yet another object is to provide means for sieving an air current to prevent the passage of insect bodies into a car while at the same time directing a stream of air toward the car seat and at the same time providing a structure in which the insects will be automatically removed by the air current when the ventilator or pivotally-mounted window is swung slightly towards closed position. A further object is to provide an air deflector having an opening or series of openings adjacent the ventilator of the automobile for directing air toward the inner surface of the windshield, a resistance screen being employed for causing the air to move forwardly through the openings against the windshield. Other specific objects and advantages will appear as the specification proceeds.

The invention is illustrated in a single embodiment, by the accompanying drawing, in which—

Figure 1 is a broken perspective view of my improved ventilator device applied to the ventilator or pivotally-mounted window of an automobile; Fig. 2, a perspective view of the deflector device shown detached from the window; Fig. 3, an enlarged broken horizontal sectional view showing the deflector secured to the frame of the ventilator window; Fig. 4, a perspective view of the inner side of the deflector structure; Fig. 5, a perspective view of a modified form of the deflector; Fig. 6, a view similar to Fig. 5 but showing a modified form of the deflector; and Fig. 7, an enlarged broken sectional view showing the deflector of Fig. 2 mounted upon the ventilator of an automobile and illustrating the inward deflection of the air against the inner face of the windshield.

The deflector device may be formed of any suitable material. In the specific illustration given in Figs. 1 to 4, inclusive, I provide a deflector sheet 10 which is formed of transparent plastic. Riveted to the bottom of sheet 10 is a metal screen 11 which extends inwardly to form a screen platform having a straight side 12 adapted to lie substantially flush against the ventilator window 13 of a car. The screen may be of any suitable mesh or structure. I prefer to employ a metal screen having a vertical flange which is riveted to the outside of the deflector sheet 10 by rivets 11a, the screen being then turned at right angles to form a platform substantially bridging the space between the deflector sheet 10 and the window 13. It will be understood that the deflector sheet 10 may be formed of translucent or colored plastic material or other material. Sheet 10 is generally sail-shaped and is arcuate as indicated best in Figs. 3 and 4.

In order to secure the deflector upon the pivotally-mounted window of ventilator 13 of an automobile, I secure by rivets 14 or other suitable means a pair of U-shaped spring members 15. The U-shaped members 15 extend around the metal frame border 16 that encloses a portion of the vertically-pivoted ventilator 13. Such windows are commonly employed on automobiles and are positioned in the forepart of the window opening on each side of the front seat of the car. The window 13 is equipped with pivots 17 which engage pivot sockets in the window frame to permit the swinging of the window 13 inwardly and outwardly. Since such vertically-pivoted window structures and the operation thereof are well-known, a further detailed description is believed unnecessary.

In the illustration given in Fig. 5, I provide a deflector 18, which is similar to the deflector 10 heretofore described but differs in that the inner edge portion 19 of the deflector is provided with a series of openings 20. As illustrated, the deflector 18 is provided with a screen 21 which interposes a resistance to the air flow and facilitates the inward flow of air through the openings 20 for sweeping the inner surface of the windshield 22.

Figs. 6 and 7 show a deflector 23 which is similar to deflector 18 except that long slots 24 are employed instead of the circular openings 20. If desired, the front edge portion 19 of the deflector 18 and the front edge portion 25 of the deflector 23 may be cut away to provide a slot running substantially the height of the deflector and to permit air to pass through the forward edge of the deflector toward the windshield.

As shown more clearly in Fig. 7, the deflector 23, which is equipped with a resistance screen 21, is mounted upon the ventilator 13 of an automobile, and the ventilator is turned so as to cause the direction of air downwardly through the screen 26 and also forwardly through the slots 24 toward the inner surface of the automobile windshield 22. Thus the mesh screen 26 serves two purposes. It prevents the carrying of insects, etc., into the car, while at the same time interposing a resistance to the flow of air which aids in the deflection of air currents through the slots 24 so as to sweep the inner surface of the windshield 22. The window frame of the automobile is designated by the numeral 27 as indicated in Fig. 7.

*Operation*

In operation, one of the deflector structures may be secured to the front edge of a vertically-pivoted window or ventilator 13, as shown more clearly in Figs. 1 and 3. The spring members 15 are expanded to receive the frame 16 of the window and thus anchor the deflector in the position illustrated in Fig. 1 and 2. When the window 13 is swung to a position as indicated in Fig. 3, a current of air is directed into the lower portion of the car toward the front seat. As insects are struck by the car and the bodies thereof carried by the air current, their bodies are collected and kept from entering the car. At intervals the driver may swing the window 13 slightly toward the closed position and it is found that the air stream is reversed to some extent, causing the insect bodies to be hurled rearwardly and away from the car. Since stale air is drawn out of the car at the vent toward the rear of window 13, this outgoing air aids in carrying the insect bodies clear of the car and the rear windows thereof. Thus, there is prevented the building-up of insect bodies upon the screen 11 and the car is kept free of the accumulated bodies of insects with a minimum of effort.

In the structure shown in Figs. 1 to 4, there is a small space through which air is deflected inwardly toward the windshield and the interposing of the screen resistance 11 aids in directing the air inwardly in generally horizontal direction and also slightly downwardly toward the driver. In the structures shown in Figs. 5 to 7, inclusive, the openings in the forward edge of the deflector are larger and a greater air stream is directed inwardly so as to sweep the inner surface of the windshield. The openings in the deflector are effective, depending upon the angle at which the ventilator window is placed, for deflecting air inwardly upon the face and shoulders of the driver or inwardly against the windshield. The air stream is divided, part of it passing through the screen and part of it through the openings 20 or 24 toward the windshield, and the screen cooperates with the openings by providing a resistance to air flow so that a portion of the air stream moves forwardly through the openings 20 or 24 toward the windshield.

While in the foregoing specification I have set forth a specific structure in considerable detail for the purpose of illustrating one embodiment of my invention, it will be understood that such details may be varied widely by those skilled in the art without departing from the spirit of my invention.

I claim:

1. In combination with a vertically-pivoted vehicle window, an air deflector comprising an arcuate sheet tapering from a wide base upwardly and inwardly substantially to a point, means for securing the forward edge of the deflector to the forward side of said vehicle window, whereby the deflector extends outwardly and then in a plane generally parallel to the window, and a screen carried by said deflector and bridging the space between the bottom of the deflector and the window.

2. In combination with a vehicle window which is mounted upon vertical pivots, an air deflector comprising an arcuate sail-shaped sheet, means for securing the forward edges of the deflector to the forward side of said vertically-pivoted vehicle window, whereby the deflector extends outwardly and rearwardly in spaced relation from said window, and a screen carried by the deflector and bridging the space between the bottom of the deflector and the window.

3. In combination with a vertically-pivoted vehicle window, portions of which are swingable to positions inside and out of the vehicle, a deflector sheet, means for securing the forward edge of the deflector sheet to the forward side of said vehicle window, and a screen secured to the lower portion of said deflector and bridging the space between the bottom of the deflector sheet and the window, said screen serving to collect insects and foreign particles carried by the air stream as the deflector directs air inwardly of the vehicle window and said screen being flushed of said insects and foreign particles by the moving of the vehicle window portion carrying said deflector in an outward direction.

4. In combination with a vertically-pivoted vehicle window, an air deflector comprising an arcuate sheet of plastic material, spring grip members carried by the sheet and secured to the forward edge of the vertically-pivoted vehicle window, and a screen secured to the lower portion of the deflector and extending inwardly to bridge the distance between the bottom of the deflector and the window, said window being swingable to bring the deflector inwardly for carrying a current of air into the car while collecting insects on the screen and being swingable outwardly to reverse the air flow for the removal of insects from said screen and exterior of the car.

SAMUEL J. ZAGEL.

REFERENCES CITED

The following references are of record in the file of this patent:

UNITED STATES PATENTS

| Number | Name | Date |
| --- | --- | --- |
| 1,337,472 | Herbst | Apr. 20, 1920 |
| 1,442,624 | Livingston | Jan. 16, 1923 |
| 2,093,174 | Giberson | Nov. 2, 1937 |
| 2,224,433 | Holden | Dec. 10, 1940 |
| 2,478,161 | Russell | Aug. 2, 1949 |